United States Patent
Ebert et al.

(10) Patent No.: US 10,750,752 B2
(45) Date of Patent: Aug. 25, 2020

(54) METHOD FOR CONTROLLING A CLIPPING MACHINE AS WELL AS A CLIPPING MACHINE THEREFOR

(71) Applicant: Poly-clip System GmbH & Co. KG, Hattersheim (DE)

(72) Inventors: Detlef Ebert, Bad Nauheim (DE); Wolfgang Nikoley, Mainz-Kastel (DE); Eugen Klassen, Oberursel (DE)

(73) Assignee: Poly-clip System GmbH & Co. KG, Hattersheim (DE)

( * ) Notice: Subject to any disclaimer, the term of this patent is extended or adjusted under 35 U.S.C. 154(b) by 0 days.

(21) Appl. No.: 16/407,036

(22) Filed: May 8, 2019

(65) Prior Publication Data

US 2019/0343135 A1 Nov. 14, 2019

(30) Foreign Application Priority Data

May 9, 2018 (EP) .................................... 18171538

(51) Int. Cl.
*A22C 11/00* (2006.01)
*A22C 11/02* (2006.01)
*A22C 13/00* (2006.01)

(52) U.S. Cl.
CPC ...... *A22C 11/0263* (2013.01); *A22C 11/0209* (2013.01); *A22C 13/0009* (2013.01)

(58) Field of Classification Search
CPC ..... A22C 11/00; A22C 11/001; A22C 11/008; A22C 11/02; A22C 11/0245; A22C 11/0263

(Continued)

(56) References Cited

U.S. PATENT DOCUMENTS

| 4,347,646 A | 9/1982 | Staudenrausch |
| 6,524,178 B1 | 2/2003 | Fassler et al. |

(Continued)

FOREIGN PATENT DOCUMENTS

| DE | 59906061 | 7/2003 |
| DE | 502005004691 | 8/2008 |

(Continued)

OTHER PUBLICATIONS

EPO; Application No. 18171538.4; European Search Report dated Oct. 18, 2018.

(Continued)

*Primary Examiner* — Richard T Price, Jr.
(74) *Attorney, Agent, or Firm* — Fitch, Even, Tabin & Flannery LLP

(57) ABSTRACT

The present invention relates to a method for producing sausage-shaped products, like sausages, containing a flowable filling material in a tubular or bag-shaped packaging casing, on a clipping machine having a control unit for controlling the clipping machine, the method comprises the steps of feeding the filling material in a feeding direction into the tubular or bag-shaped packaging casing stored on a filling tube and being closed at the front end by a closure means, like a closure clip, gathering the filled tubular or bag-shaped packaging casing by gathering means arranged downstream the filling tube, for forming a plait-like portion thereto, and placing and closing at least one closure means on the plait-like portion for closing the filled tubular or bag-shaped packaging casing. The method includes the steps of starting the production process, automatically capturing at least one value of at least one parameter of the clipping machine and setting the captured value as the target value for said parameter in the further production process. The present (Continued)

invention further relates to a clipping machine on which the inventive method may be executed.

11 Claims, 3 Drawing Sheets

(58) Field of Classification Search
USPC .................. 452/30–32, 35–37, 46–48, 51
See application file for complete search history.

(56) References Cited

U.S. PATENT DOCUMENTS

| | | | | |
|---|---|---|---|---|
| 7,775,859 B2* | 8/2010 | May | ........................... | B65B 1/04 452/30 |
| 8,696,414 B2* | 4/2014 | Ebert | .................... | A22C 11/105 452/21 |
| 8,795,038 B2* | 8/2014 | Fischer | ................ | A22C 15/002 452/51 |
| 8,808,066 B2* | 8/2014 | Haschke | .............. | A22C 11/125 452/48 |
| 8,808,067 B2* | 8/2014 | Waldstadt | .............. | A22C 11/00 452/51 |
| 8,855,807 B2* | 10/2014 | May | .......................... | B65B 9/15 452/31 |
| 8,870,058 B2* | 10/2014 | Ebert | .................... | A22C 11/127 235/375 |
| 2008/0274681 A1 | 11/2008 | Hanten | | |

FOREIGN PATENT DOCUMENTS

| | | |
|---|---|---|
| EP | 0962143 B1 | 6/2003 |
| EP | 1428437 A1 | 6/2004 |
| EP | 1731432 A1 | 12/2006 |
| EP | 1570740 B1 | 7/2008 |
| EP | 3006358 A1 | 4/2016 |

OTHER PUBLICATIONS

Russian Patent Office; Application No. 2019113741; Office Action dated Mar. 25, 2020.
Russian Patent Office; Application No. 2019113741; Office Action dated Nov. 26, 2019.

\* cited by examiner

METHOD FOR CONTROLLING A CLIPPING MACHINE AS WELL AS A CLIPPING MACHINE THEREFOR

CROSS-REFERENCE TO RELATED APPLICATION

The present application claims the benefit of priority of European Patent Application No. 18171538.4 filed on May 9, 2018, the content of which is incorporated herein by reference in its entirety.

FIELD OF THE INVENTION

The present invention relates to a method for producing sausage-shaped products, like sausages, containing a flowable filling material in a tubular or bag-shaped packaging casing, and a clipping machine on which said method may be executed.

BACKGROUND OF THE INVENTION

In practice, it is known that, for example in the production of sausage-shaped products, like sausages, filling material is fed by a filling machine through a filling tube of a clipping machine into a tubular or bag-shaped packaging casing which is stored on the filling tube and which is closed at its front end by a closure clip as a closure means, i.e. the end of the packaging casing pointing in the feeding direction of the filling material. The tubular or bag-shaped packaging casing is pulled-off from the filling tube while being filled by the feeding pressure. A casing brake assembly is positioned in the region of the front end of the filling tube, i.e. the end of the filling tube facing in feeding direction, in order to apply a frictional force to the tubular or bag-shaped packaging casing while being pulled-off from the filling tube.

After a predetermined volume of filling material has been filled into said tubular or bag-shaped packaging casing, a displacer arrangement or gathering means, respectively, with a first and a second displacer unit which can each be formed by a pair of reversibly moveable displacement elements, gathers the filled tubular or bag-shaped packaging casing and shapes a plait-like portion thereto. The clipping device of the clipping machine then places and closes at least one closure clip at the plait-like portion forming the rear end of the sausage-shaped product, i.e. the end pointing against the feeding direction by respective closing tools which are reversibly movable towards the plait-like portion.

In known clipping machines, programs are stored for each product to be produced. These programs include data regarding the product, i.e. its size and/or the volume of filling material to be filled in for one product and/or the kind and/or size of the packaging casing and/or the type of closure means to be used, and/or operation parameters, like the pressure of the casing brake and/or the frequency of clipping cycles and/or the clip closing pressure. Sensor arrangements are provided for sensing the actual values of these operation parameters, and said values are compared with the stored information. In case that one or more of said actual parameter values exceed the stored values, the production rate may be reduced or the clipping machine may be stopped.

From EP patent application 1 731 432, a clipping machine is known in which the closing pressure is measured by a respective sensor device. The result of this measurement is compared with a number of threshold values, and, dependent on the exceeded threshold, the actual closing cycle is terminated or the clipping machine is stopped immediately.

In such known clipping machines, an operator has to select or set various parameters for the product to be produced and the operation parameters for the production process. However, the operator does not know the actual wearing situation of the clipping machine so that the set parameters are not in line with the deterioration of the machine.

It is an object of the present invention to optimize the process of producing sausage-shaped products, to reduce the risk of defective goods and damages to the clipping machine.

SUMMARY OF THE INVENTION

According to the present invention, there is provided a method for producing sausage-shaped products, like sausages, containing a flowable filling material in a tubular or bag-shaped packaging casing, on a clipping machine having a control unit for controlling the clipping machine, the method comprises the steps of feeding the filling material in a feeding direction into the tubular or bag-shaped packaging casing stored on a filling tube and being closed at the front end by a closure means, like a closure clip, gathering the filled tubular or bag-shaped packaging casing by gathering means arranged downstream the filling tube, for forming a plait-like portion thereto, and placing and closing at least one closure means on the plait-like portion for closing the filled tubular or bag-shaped packaging casing. The inventive method further includes the steps of starting the production process, automatically capturing at least one value of at least one parameter of the clipping machine, providing the captured value with an offset value and using the captured value for monitoring said parameter in the further production process.

By capturing at least one actual value of at least one parameter of the clipping machine, a value for said parameter has automatically been found, on the basis of which the further production process may be executed. The captured value is provided with an offset value and used for monitoring the further process within the range of the offset value. It has to be noted that, in principle, the offset value comprises a single value. However, it is preferred that the offset value includes an upper offset value and a lower offset value. Accordingly, an operator does not need to input the value for this parameter, whereby a miss-adjustment of the clipping machine by the operator may be prevented. In the case the value of the respective parameter exceeds or falls below the captured value such that it leaves the range of the captured value formed by the offset value, the clipping machine may be stopped, or the production process may be manipulated in any other suitable manner. Additionally, a signal may be output for informing the operator. Furthermore, different batches of the material used in the production, like the packaging casing and/or the closure means, like the closure clips, may include variations. Moreover, the respective parameter may vary due to wear or the current maintenance conditions. By the inventive method, such variations may be considered in the production process.

The size of the offset value defining the range within which the value of the monitored parameter may vary, has to be selected such that, on one hand, the clipping machine may continuously be operated for producing sausage-shaped products, without stopping each time a small variation in the monitored parameter occurs which is caused by small variations e.g. in material properties. On the other hand, the range of the value should be selected such that important errors, e.g. which would result in damages to the clipping machine and/or the sausage-shaped products, are securely detected and a respective action of the clipping machine or the operator may be initiated.

The value range provided by the offset value may be selected on the basis of respective experiences for such values. Usually, an offset value of approximately 10% of the value of the monitored parameter would be sufficient. However, also higher offset values are possible, e.g. up to 30%, which may be necessary in specific cases and/or depending on the parameter the value of which shall be captured.

The height of the offset value may be selected dependent on the kind of the clipping machine and/or the kind of closure clips.

The offset value may also be selected as a fixed percentage of the captured value of the parameter to be monitored, or may be provided as a fixed value.

In a preferred embodiment of the inventive method, the at least one value of said at least one parameter may be captured at each start of the clipping machine. Thereby, the specific features of the packaging casing and/or the closure means used in the production process and/or the wearing of the clipping machine and/or the type of the product (diameter and/or length, filling material, label attachment etc.) to be produced may be considered. Furthermore, the value of the respective parameter is also captured after a restart of the clipping machine, e.g. after the clipping machine has been stopped for refilling casing material and/or closure clips, or after an accidental interruption of the production process.

Additionally, or alternatively, the at least one value of the at least one parameter may be captured during a predefined numbers of clipping cycle after the start of the clipping machine. On the basis of this number of captured values, an average value may be formed and provided with the offset value and used for monitoring the parameter of the clipping machine.

Alternatively, or additionally, the at least one value of said at least one parameter may be captured during at least a selected period of at least one clipping cycle of the clipping machine. Thereby, the specific value of the respective parameter at specific time points of a clipping cycle may be captured, e.g. at that time on which the closure clip is closed, and on which the parameter may reach a maximum value. Alternatively, the value of said parameter may also be captured during a complete clipping cycle.

Furthermore, by capturing the at least one value of the respective parameter of the clipping machine at each production start, alterations of specific properties of the clipping machine may be detected, which, e.g., may be occurred by wear.

It may further be of advantage to capture the at least one value of the at least one parameter at a predefined time point of a clipping cycle. The specific time point may correlate to a specific position or rotational angle of one or more machine elements. This allows to capture a specific value at said specific time point, like a maximum or minimum value of said parameter. Said specific value may be a hint to the quality of the product or a property of the clipping machine, like wear of specific elements. It has to be noted that the specific time points in which said parameter reaches a maximum or minimum value depends on the kind of the clipping machine and/or the kind of the products to be produced. Thus, selecting a period of a clipping cycle or a complete clipping cycle for capturing the value of the respective parameter provides a more general method applicable to a wide variety of clipping machines.

In a further advantageous embodiment, the method further comprises the step of providing the clipping machine with a drive unit having a controller, wherein the captured at least one parameter is a parameter of said drive unit. The drive unit of a clipping machine can be a central unit which can influence the whole production process. Thus, the at least one value of the at least one parameter of the drive unit may also be descriptive for the production process and/or the quality of the product.

In the case that at least one value of the at least one parameter of the drive unit of the clipping machine is captured, the at least one parameter may be at least one of torque or current captured by the controller of the drive unit.

As an example, the drive unit may include a stepper motor having a controller. In this case, the parameter, like torque or current, may be derived from the controller.

Naturally, at least one value of any other parameter which is representative for the production process or at least a production step, may be captured to be set as the target value for the further process, like, for example, the length or the speed of the tubular or bag-shaped packaging casing while being pulled-off from the filling tube.

Storing the captured values is not necessary, since the at least one value of the respective at least one parameter is refreshed at least by starting the clipping machine or after predetermined regular intervals.

However, the at least one value of the at least one parameter captured during a production process may be stored in a storage device, e.g. for statistical evaluation, or for proof of quality. The stored values may be used, e.g. for evaluating the maintenance conditions of the clipping machine, and/or for providing a notice for a possible preventive maintenance. The storage device may be a separate device or may be part of the control unit of the clipping machine.

In principle, capturing the value of one parameter may be sufficient. However, in a further preferred embodiment, at least one value of more than one parameter is captured. One or more further parameters may provide an increase in reliability of the production process.

Further according to the present invention, the inventive method further comprises the step of switching the clipping machine between an operation mode on the basis of at least one captured value of said at least one parameter and an operation mode on the basis of data stored in the control unit. The possibility to select one of the operation modes increases the flexibility of the production process with regard to the kinds of products to be produced.

Alternative to the selection of an operation mode on the basis of the at least one captured value of said at least one parameter and an operation mode on the basis of data stored in the control unit, it is also possible to select one or more other parameters than that presently selected, in order to increase the reliability of the production process.

According to the present invention, there is further provided a clipping machine for producing sausage-shaped products, like sausages, containing a flowable filling material in a tubular or bag-shaped packaging casing, the clipping machine comprises a filling tube for feeding filling material into the tubular or bag-shaped packaging casing stored on the filling tube and being closed at the front end by a closure means, like a closure clip, a casing brake assembly arranged on the filling tube, for applying a braking force to the tubular or bag-shaped packaging casing while being pulled-off from the filling tube, gathering means for gathering the filled tubular or bag-shaped packaging casing and for forming a plait-like portion thereto and a clipping device for placing and closing at least one closure means on the plait-like portion. The inventive clipping machine further comprises a control unit for controlling the clipping machine, the control unit is adapted to capture at least one value of at least one parameter of the clipping machine, to provide said value with an offset value, and to use the captured value for monitoring said parameter during the further production process.

In a preferred embodiment, the clipping machine is adapted to be switched between an operation mode on the basis of the at least one captured value of said at least one parameter and an operation mode on the basis of data stored in the control unit.

Furthermore, it is of advantage that the inventive clipping machine comprises a storage device for storing the at least one value of the at least one parameter captured during a production process. The stored values may be used e.g. for statistical evaluation, or for proof of quality, or for evaluating the maintenance conditions of the clipping machine, and/or for providing a notice for a possible preventive maintenance.

The clipping machine according to the present invention thereby provides all advantages as explained in conjunction with the inventive method.

Further advantages and preferred embodiments of the present invention will be described in the following together with the drawings listed below. The expressions "left", "right", "below" and "above" used in the following description are referred to the drawings in an alignment such that the reference numbers and the notation of the figures used can be read in normal orientation.

DETAILED DESCRIPTION

Figure 1:
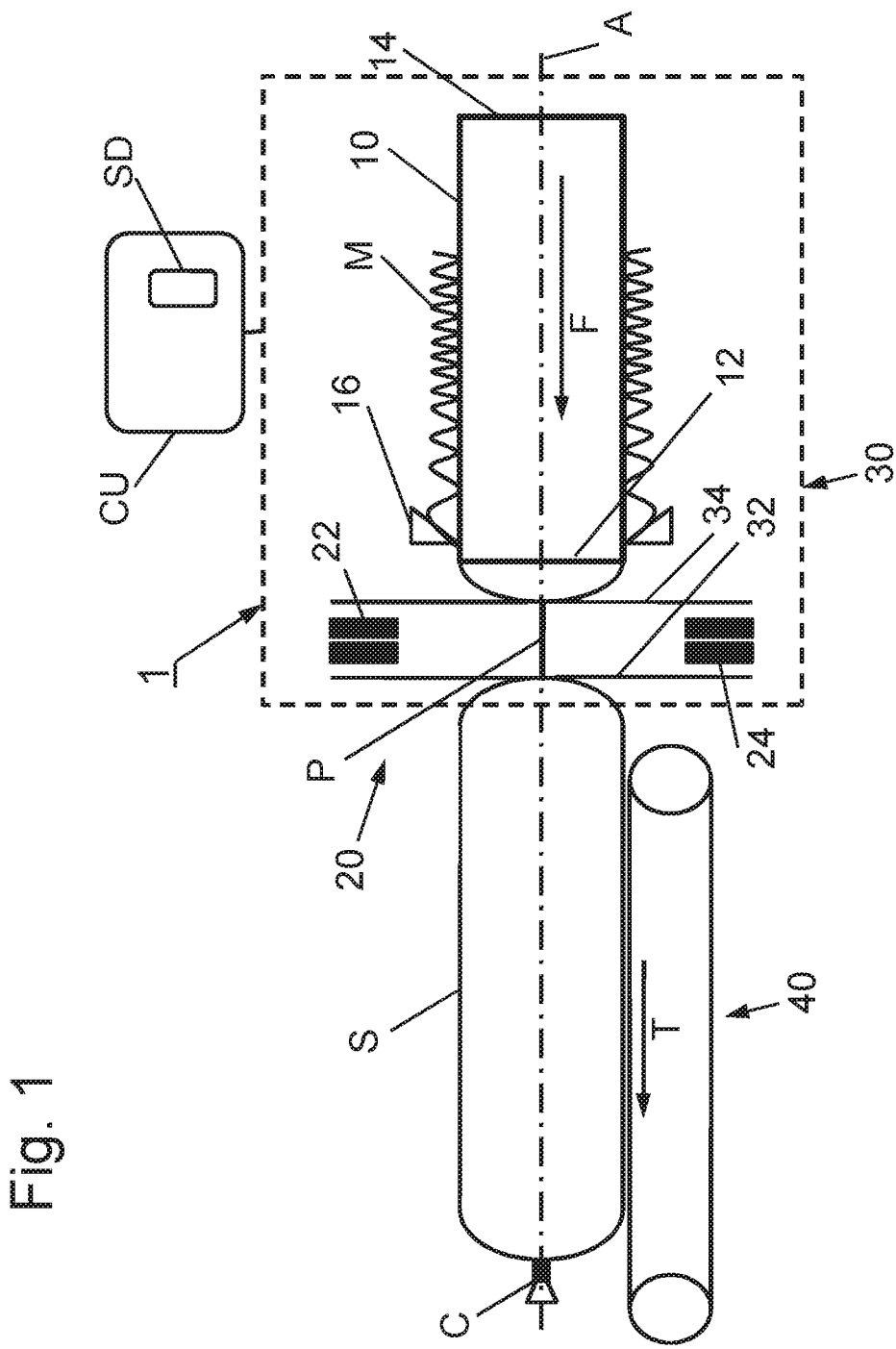
FIG. 1: is a schematic view showing the principal design of a clipping machine.

A clipping machine CM for producing sausage-shaped products S, like sausages, which contain a flowable filling material in a tubular or bag-shaped packaging casing M, is shown schematically in FIG. 1. Clipping machine CM comprises a filling tube 10 having a longitudinally and horizontally extending central axis A, with a discharge opening for discharging the filling material at its left end 12 and a feeding opening for feeding the filling material in a feeding direction F to the discharge opening of filling tube 10, for example by a feeding pump (not shown), at its right end 14. Moreover, a casing brake assembly 16 is arranged on and coaxially with filling tube 10 in the region of the left end 12 of filling tube 10. Filling tube 10 is made of a suitable material, like stainless steel.

A supply of tubular packaging casing M made of a thin sheet material is stored on filling tube 10 in a folded manner like a concertina. From the supply of tubular packaging casing M, tubular packaging casing M is pulled-off during the process of producing the sausage-shaped products S, in particular by the feeding pressure for filling the filling material into tubular packaging casing M wherein casing brake assembly 16 provides a braking force for allowing a controlled pulling-off of tubular packaging casing M during the filling process.

Clipping machine CM further comprises a clipping device 20 for closing a filled tubular packaging casing M by applying closure means, like closure clips or closing clips C, to a plait-like portion P, and gathering means 30 for gathering the filled tubular packaging casing M and forming said plait-like portion P thereto. These components are all arranged downstream filling tube 10.

As can be inferred from FIG. 1, clipping device 20 is positioned immediately downstream left end 12 of filling tube 10, and coaxially aligned to filling tube 10. Clipping device 20 comprises a first and a second clipping tool 22, 24 formed by a punch 22 and a die 24. It has to be noted that punch 22 and die 24 may apply and close a single closure clip C for closing the just filled tubular packaging casing M, or may apply and close two closure clips C at the same time, a first closure clip C for closing the rear end of the just filled tubular packaging casing M for forming a sausage-shaped product S, and a second closure clip C for closing the front end of a tubular packaging casing M subsequently to be filled.

Gathering means 30 include a first displacer unit 32 and a second displacer unit 34, wherein first displacer unit 32 is positioned downstream second displacer unit 34. First and second clipping tools 22, 24 of clipping device 20 may be positioned between first and second displacer units 32, 34, at least for applying and closing one or two closure clips C to plait-like portion P. First displacer unit 32 can reversibly be moved parallel to feeding direction F of the filling material.

For discharging a sausage-shaped product S just produced from clipping machine CM, in a transportation direction T being substantially the same as feeding direction F, a discharge device is arranged downstream clipping device 20, which may be a belt conveyor 40 comprising a conveyor belt and guide rollers. In a simple case, discharge device 20 may be a chute.

Clipping machine CM further comprises a control unit CU for controlling clipping machine CM, and a drive unit (not shown) for driving the components of the clipping machine CM, like e.g. first and second clipping tool 22, 24 of clipping device 20 and first as well as second displacer unit 32, 34 of gathering means 30 and other components or assemblies of clipping machine CM that require a drive. The drive unit is coupled to and controlled by control unit CU. Control unit CU may further include a storage device SD, for storing data regarding the production process and sausage-shaped product S, at least during the production process. These data may be used e.g. to prove the production conditions and the quality of sausage-shaped product S.

As already mentioned, the drive unit drives one or more components of clipping machine CM, like clipping device 20 or gathering means 30. Furthermore, it is possible that casing brake assembly 16 is controlled by control unit CU, e.g. for adjusting the braking force acting on tubular packaging casing M, or by reversibly moving casing brake assembly 16 along filling tube 10.

Clipping machine CM may also be of that kind provided with a central cam-disc that is driven by a single drive unit, like an electric motor. The central cam-disc in turn drives all other components of the clipping machine, like first and second clipping tool 22, 24 of clipping device 20, first and second displacer units 32, 34 and a clip feed.

Naturally, also other components or peripheral devices, like discharge device 40 or a pump for feeding filling material through filling tube 10, may be controlled by control unit CU.

Figure 2:
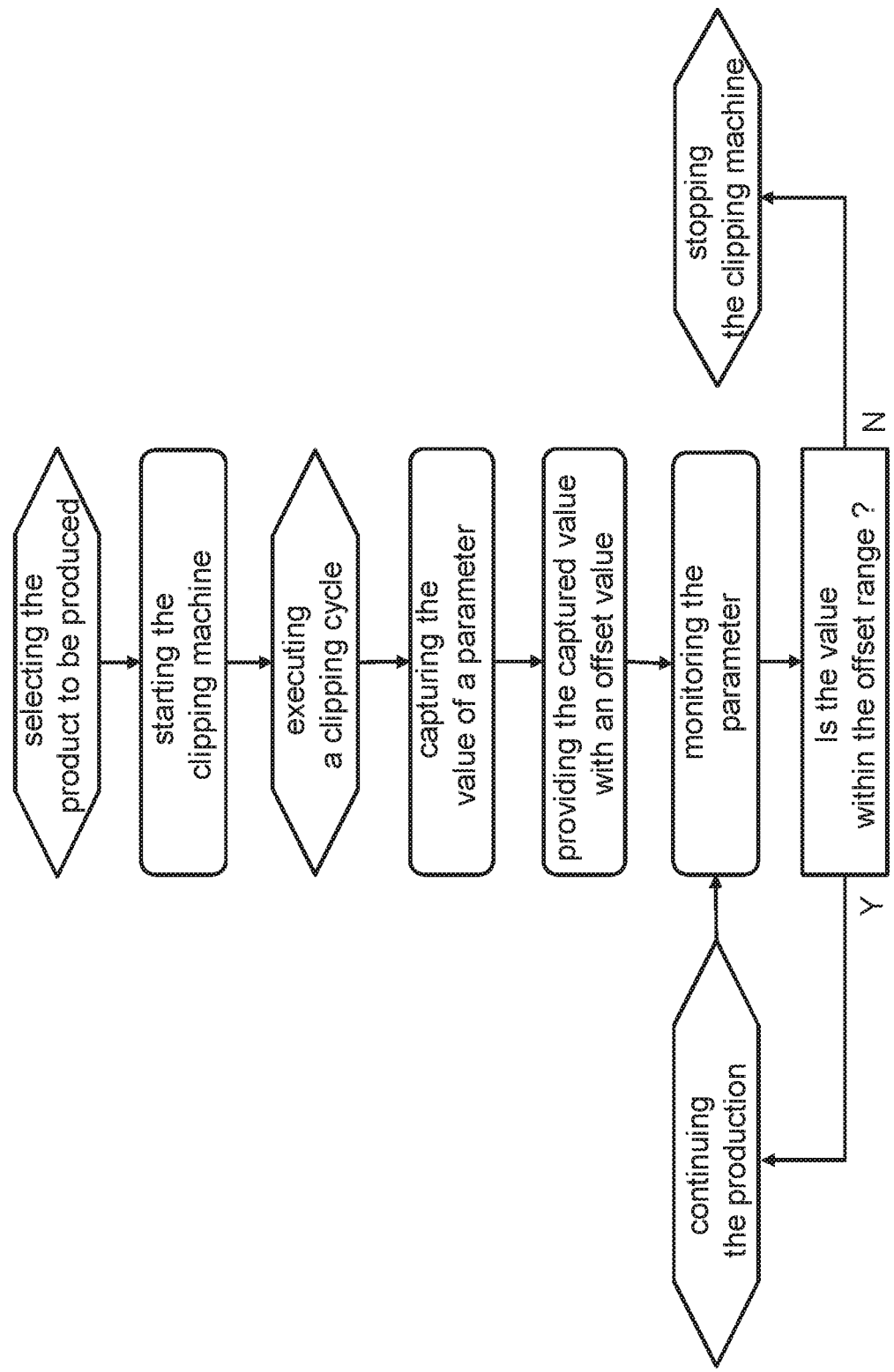
FIG. 2: is a flow chart of a first embodiment of the method for producing sausage-shaped products, according to the present invention.

FIG. 2 is a flow chart of a first embodiment of the method for producing sausage-shaped products S, according to the present invention.

As can be seen from this flow chart, after a product to be produced is selected, e.g. by the operator, clipping machine CM is started and at least one clipping cycle (=start clipping cycle) is executed, i.e. at least one sausage-shaped product S is produced by filling packaging casing M already closed at its first end by a first closure clip C via clipping device 20, forming a plait-like portion P by gathering means 30, providing at least one second closure clip S on plait-like portion P by clipping device 20 for closing the second end of packaging casing M and finally cutting-off the packaging casing M of the just produced sausage-shaped product S from remaining packaging material M on filling tube 10. During this start or initial clipping cycle, at least one value of at least one parameter of clipping machine CM is captured or acquired, respectively.

The parameter, the value of which has to be captured, can be a predefined parameter lodged in control unit CU, or it can be chosen by the operator on the basis of a list of operating parameters of clipping machine CM presented by control unit CU on a display, preferably in dependency of the product to be produced. The parameter can be selected on the basis of one or several different factors having influence on the production process, like the type and/or size of sausage-shaped product S and/or the production speed and/or the type of packaging casing M and/or other factors like providing labels to a sausage-shaped product S. Preferably, the parameter is the torque or current consumption of the drive unit.

It has to be noted that it is also possible to produce some more sausage-shaped products S to acquire more values of the at least one parameter during the start clipping cycle as explained below in conjunction with the second embodiment of the present invention.

This at least one parameter is at least one operation parameter of clipping machine CM and may, for example, be a torque or force applied by the drive unit to at least one driven component of clipping machine CM, like clipping device 20 and/or gathering means 30, or a torque or force corresponding to a force applied by these components of clipping machine CM to closure clips C while being closed and/or to tubular casing material M while being gathered or while plait-like portion P is formed and/or the braking force provided by casing brake assembly 16 and/or any other suitable parameter used for controlling clipping machine CM during the production process.

Preferably, a number of clipping cycles is executed during which the value of the selected parameter is captured, and an average value of the parameter is formed. The number of clipping cycles for capturing the value of the parameter may be selected e.g. dependent on the kind of clipping machine CM or the kind of sausage-shaped product S to be produced. However, five to ten clipping cycles may be sufficient for securely capturing a reliable value.

Thereafter, assuming that this start clipping cycle or number of cycles has been executed without any problems, the captured or acquired value is provided with an offset value forming a range within which the value of the parameter may vary, and the production process is continued. In case that the range of the value provided by the offset value is exceeded, or the actual value of the parameter falls under the value range, clipping machine CM may be stopped.

The offset value is provided as an upper offset and a lower offset which are the maximum and the minimum values which the current parameter value is allowed reach. The offset value is selected such that clipping machine CM may execute a continuous production process. Usually, the offset value may amount up to 10% of the value of the parameter. However, dependent on the type of clipping machine CM or the kind of sausage-shaped product S to be produced, the height of the offset value may be adapted accordingly.

Figure 3:
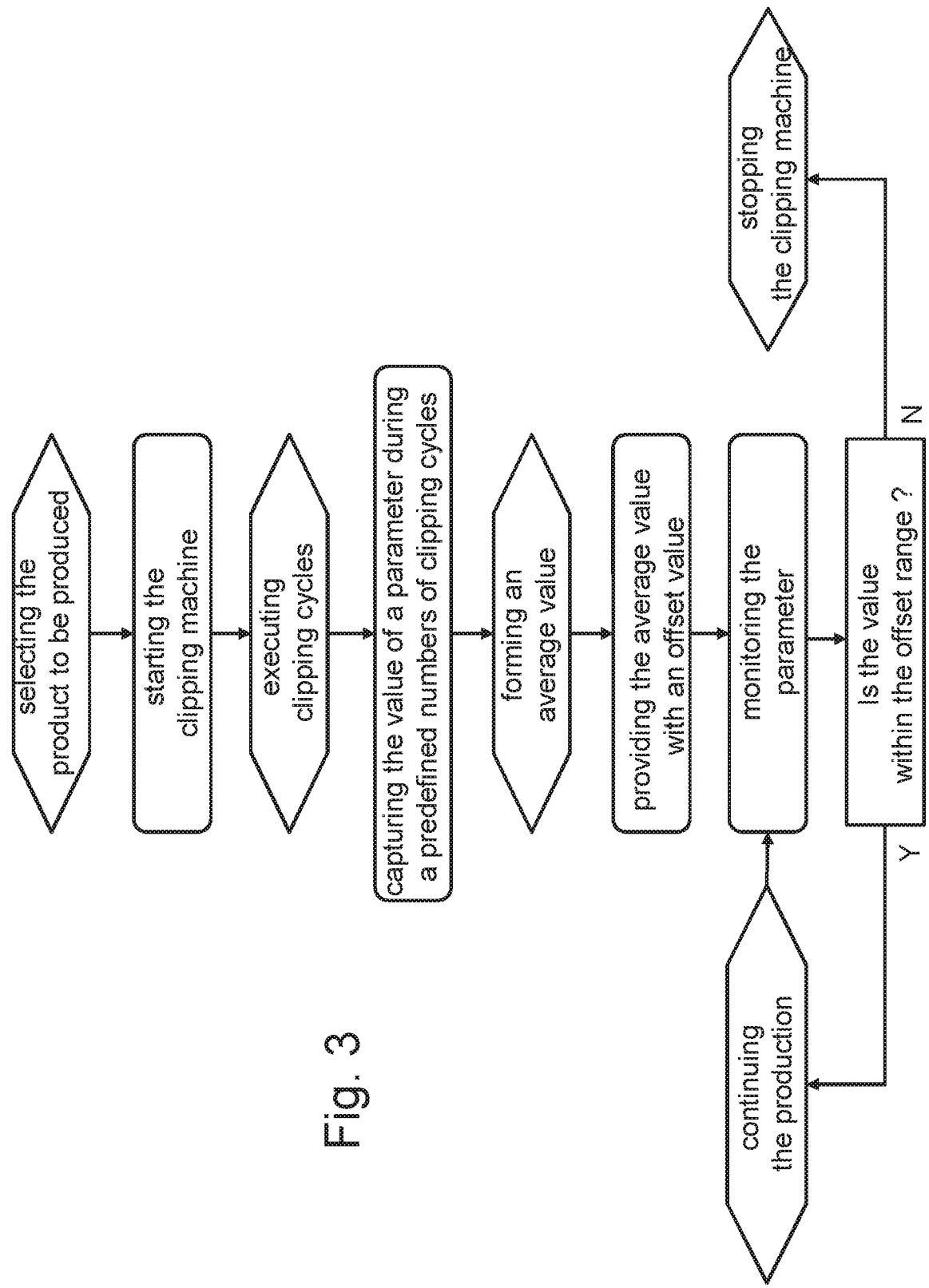
FIG. 3: is a flow chart of a second embodiment of the method for producing sausage-shaped products, according to the present invention.

FIG. 3 is a flow chart of a second embodiment of the method for producing sausage-shaped products S, according to the present invention.

The method according to the second embodiment is in line with the steps of the method according to the first embodiment, particularly with regard to the steps of starting clipping machine CM, capturing at least one value of at least one parameter, providing the captured value with an offset value defining a range within which the target value may vary, and using the captured value for monitoring this parameter.

The method according to the second embodiment differs from the method of the first embodiment in that the value of said parameter is not only captured during one clipping cycle, but during a predefined number of subsequently executed clipping cycles, like during the first five to ten clipping cycles.

After said preferably predefined number of values of said parameter have been obtained, an average value of these captured values is formed, the average value is provided with an offset value, and is used for monitoring the value of the parameter. By forming an average value from a predefined number of values, small variations in the single values may be balanced.

The number of cycles during which the values of the parameter are captured for forming an average value and thus the number of values to be acquired may be selected dependent on the product to be produced and/or the production speed and/or the kind of parameter and/or the type of packaging casing M and/or other factors like providing labels to a sausage-shaped product S and/or any other suitable parameter used for controlling clipping machine CM during the production process.

Naturally, also in the method according to FIG. 3, when exceeding the value of the parameter, and particularly, the value range provided by the offset value, a respective reaction may be triggered, like stopping clipping machine CM, and/or outputting a signal to the operator.

It is further possible to capture the value of said at least one parameter during one clipping cycle, and to use this value for monitoring the parameter, and to repeat this procedure in predefined intervals, e.g. to capture the value of the parameter after every tenth or twentieth cycle, and to use the captured value for monitoring the parameter during this interval. The length of this interval may be selected e.g. dependent on the total number of clipping cycles of the production process and/or the size of the clip supply or the supply of tubular or bag-shaped packaging casing M.

Independent from whether the value of the parameter is captured only once or several times, or subsequently or in predefined intervals, the value of the parameter is captured each time clipping machine CM is started. This is done at each start of the production process and also after each interruption of the production process, e.g. for refilling clips C or tubular or bag-shaped packaging casing M, or after a malfunction or maintenance.

For example, the parameter may be a parameter of the drive unit, like the torque transferred to the driven component of clipping machine CM, or the current of the drive unit. These parameters may be used to indicate a quality property of the product just produced.

An example for controlling clipping machine CM on the basis of the inventive method is the following: in the case that the driven component is clipping device 20, and particularly clipping tools 22, 24, on the basis of the value of the parameter "torque" and/or "current" captured during the clipping cycle, an indication of the closing force is given. Particularly, a huge increase in the presumed closing force may be indicative for an additional closure clip C erroneously sticking in one of clipping tools 22, 24. A significant decrease in the presumed closing force may indicate the absence of one or both closure clips C, and thus, indicate e.g. an empty clip supply or a break in the line of clips C.

In the case that the drive component is gathering means 30, an increase in the parameter "torque" and/or "force" may indicate folds in packaging casing M which impede the gathering of filled tubular or bag-shaped packaging casing M and/or the forming of plait-like portion P thereto. On the other hand, a significant decrease in the parameter "torque" and/or "force" may be caused by a casing burst, or the absence of packaging casing M, e.g. the supply of packaging casing M on filling tube 10 may be empty.

The same is true in the case in which clipping machine CM includes a central cam-disc that is driven by a single drive unit, like a servo motor, and the central cam-disc drives the components of clipping machine CM, like clipping device 20, and particularly clipping tools 22, 24, and gathering means 30. During one revolution of the central cam-disc, one clipping cycle is executed. The components are activated at respective angular positions or angular ranges of the central cam-disc. That means, in specific angular positions or during respective angular ranges, gathering means 30 execute the gathering of filled tubular casing M and the spreading operation for forming plat-like portion P. Subsequently, in a respective other angular position or range, closing tools 22, 24 execute the closing operation with placing and closing one or two closure clips C at plait-like portion P.

These operations are executed in an angular range of approximately 90° to 270° of the cam-disc. Particularly in this angular range, the maximum values of the parameter to be monitored are expected, like the maximum torque of the drive unit, or the maximum current consumption. Accordingly, it is preferred that the value of the parameter to be monitored is captured in this angular range. Alternatively, it is also possible to capture the value of the parameter to be monitored during the complete revolution of the cam-disc.

Alternatively, one or several other parameters may be selected for forming a basis on which clipping machine CM may be controlled, like the length or the speed of packaging casing M while being pulled-off from filing tube 10, or the volume and speed of the filling material fed through filling tube 10.

According to the present invention, it is also possible that the values of more than one parameter of clipping machine CM are captured. The combination of the values of the different parameters may be used to indicate the quality of sausage-shaped product S or the production process. As an example, the closing pressure may indicate the tightness of closed clip(s) C, and the force applied by gathering means 30 indicates the filling degree or slackness of the sausage-shaped product S.

The value of the selected parameter may be captured at different specific time points during a clipping cycle, which results in respective different values of said parameter. The specific time point may correlate to a specific position or rotational angle of machine elements, like the central cam-disc or a central gear wheel, representing different load states of the respective machine component, or a specific production state of sausage-shaped product S.

This allows to capture a specific value at said specific time point, like a maximum or minimum value of said parameter, e.g. a maximum or minimum force or torque, and at a selected time point during filling packaging casing M, the gathering process or the closing of one or several closure clips C.

Said specific value may be a hint to the quality of the product or a property of clipping machine CM, like wear of specific elements.

In order to securely start the production process, the sausage-shaped product S to be produced is selected by the operator and clipping machine CM is started in an automatic mode.

During the first clipping cycle, or a predefined number of clipping cycles, the value of the selected parameter is captured or acquired, the captured value, or an average value formed from several captured values, is provided with an offset value and used for monitoring the further process, and the production process is continued on the basis of the captured value(s) and the range provided by the offset value.

Accordingly, the production process may be executed on the basis of an automatically captured value which recognize the actual conditions of clipping machine CM, like the maintenance conditions, wear conditions, type of machine or its size, in particular in case of acquiring the values of several different parameters of clipping machine CM. All these factors are automatically taken into account by the automatic capturing of the value of the parameter to be monitored, and the further monitoring of said parameter within the range of the offset value. Thus, it is not necessary for an operator to identify specific conditions of clipping machine CM, and to adjust clipping machine CM manually. Thereby, the production process is more reliable, and miss-adjustments may be omitted.

Dependent on the kind of parameter to be monitored in the inventive manner, exceeding or falling below the offset value is an indication for a possible problem, like a casing burst, an empty casing supply, a break in the line of clips or more than one clip in clipping tools 22, 24. In response thereto, control unit CU may act on clipping machine CM, e.g. by shutting down clipping machine CM or stopping the flow of filling material. Additionally, a respective signal may be output for informing an operator. The signal may also include an indication of the kind of malfunction, to allow a rapid removal of the malfunction, for quickly restarting the production process.

Clipping machine CM is further provided with a switch for deactivating the inventive method of controlling clipping machine CM by capturing the value of at least one parameter and monitoring said parameter based on the captured value. Deactivating the inventive method by switching the clipping machine CM into a "normal" mode allows to produce sausage-shaped products S in a conventional way, and it particularly allows the selected parameter to vary during the production process without causing stopping the production process. For example, it is possible to produce sausage-shaped products or sausages S on the same clipping machine CM as single sausages S in the inventive automatic mode or as a chain of sausages S including two or more interconnected sausages S with only a single closure clip C between two subsequent sausages S in the "normal" mode, in which the parameter, like the closing force varies during the production process, as explained below.

As an example for producing single sausages S, a portion of filling material is fed through filling tube 10 into tubular packaging casing M. Filled tubular or bag-shaped packaging casing M is then gathered by gathering means 30 and a plait-like portion P is formed thereto. On plait-like portion P, two closure clips C are placed and closed, a first closure clip C for closing the just filled portion of packaging casing M and a second closure clip C for closing the front end of packaging casing M subsequently to be filled, and plait-like portion P is severed between the two closure clips C for separating the sausage S just produced from packaging casing M being placed on filling tube 10. This means that in each clipping cycle, two closure clips C have to be placed and closed, which requires a specific, approximately constant amount of closing force. On the other hand, while producing a chain of sausages S, between subsequent sausages S, only one closure clip C may be placed and closed, whereas, while forming the front end and at the rear end of said chain of sausages S, two closure clips C have to be placed and closed, in accordance with the production of single sausages S. Thereby, the closing force necessarily varies. Accordingly, in this case, the automatic mode in which the value of the selected parameter is captured, provided with an offset value and used for monitoring said parameter during the further production process has to be switched off.

Providing said switch for allowing to switch between the different operation modes increases the flexibility of clipping machine CM regarding the kinds of products which may be produced on said clipping machine CM.

With regard to the "switch", it has to be noted that said switch not necessarily needs to be a mechanical switch. According to the present invention, a switching between the different operation modes may also be executed by entering the processing program stored in control unit CU of clipping machine CM, e.g. via a respective input at control unit CU, by a touch panel or the like.

What is claimed is:

1. A method for producing sausage-shaped products containing a flowable filling material in a tubular or bag-shaped packaging casing, on a clipping machine having a control unit for controlling the clipping machine, the method comprising the steps of:
    feeding the filling material in a feeding direction into the tubular or bag-shaped packaging casing stored on a filling tube and being closed at the front end by a closure means;
    gathering the filled tubular or bag-shaped packaging casing by gathering means arranged downstream the filling tube, for forming a plait-like portion thereto; and
    placing and closing at least one closure means on the plait-like portion for closing the filled tubular or bag-shaped packaging casing;
    the method including the further steps of:
    starting the production process;
    automatically capturing at least one value of at least one parameter of the clipping machine;
    providing the captured value with an offset value; and
    using the captured value for monitoring said parameter in the further production process.

2. The method according to claim 1, wherein the at least one value of said at least one parameter is captured at each start of the clipping machine.
3. The method according to claim 1, wherein the at least one value of the at least one parameter is captured during a predefined numbers of clipping cycles after the start of the clipping machine.
4. The method according to claim 1, wherein the at least one value of said at least one parameter is captured during at least a selected period of at least one clipping cycle of the clipping machine.
5. The method according to claim 1, wherein the at least one value of the at least one parameter is captured at a predefined time point of a clipping cycle.
6. The method according to claim 1, further comprising the step of providing the clipping machine with a drive unit having a controller wherein the at least one parameter is a parameter of said drive unit.
7. The method according to claim 6, wherein the at least one parameter is at least one of torque or current captured by the controller of the drive unit.
8. The method according to claim 1, wherein at least one value of more than one parameter is captured.
9. The method according to claim 1, further comprising the step of switching the clipping machine between an operation mode on the basis of at least one captured value of said at least one parameter and an operation mode on the basis of data stored in the control unit.
10. A clipping machine for producing sausage-shaped products, containing a flowable filling material in a tubular or bag-shaped packaging casing, the clipping machine comprising:
    a filling tube for feeding filling material into the tubular or bag-shaped packaging casing stored on the filling tube and being closed at the front end by a closure means;
    a casing brake assembly arranged on the filling tube, for applying a braking force to the tubular or bag-shaped packaging casing while being pulled-off from the filling tube;
    gathering means for gathering the filled tubular or bag-shaped packaging casing and for forming a plait-like portion thereto; and
    a clipping device for placing and closing at least one closure means on the plait-like portion;
    characterized by further comprising a control unit for controlling the clipping machine, the control unit being adapted to capture at least one value of at least one parameter of the clipping machine after the start of the production process, to provide the captured value with an offset value, and to use the captured value for monitoring said parameter during the further production process.
11. The clipping machine according to claim 10, wherein the clipping machine is adapted to be switched between an operation mode on the basis of the at least one captured value of said at least one parameter and an operation mode on the basis of data stored in the control unit.

* * * * *